US009898002B2

(12) United States Patent
Schneid et al.

(10) Patent No.: US 9,898,002 B2
(45) Date of Patent: Feb. 20, 2018

(54) METHOD FOR OPERATING A FIELDBUS PROTOCOL CAPABLE FIELD DEVICE

(71) Applicant: Endress + Hauser Wetzer GmbH + Co. KG, Nesselwang (DE)

(72) Inventors: Christian Schneid, Nesselwang (DE); Michael Schnalke, Nesselwang (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 233 days.

(21) Appl. No.: 14/647,716

(22) PCT Filed: Oct. 29, 2013

(86) PCT No.: PCT/EP2013/072575
§ 371 (c)(1),
(2) Date: May 27, 2015

(87) PCT Pub. No.: WO2014/082808
PCT Pub. Date: Jun. 5, 2014

(65) Prior Publication Data
US 2015/0331413 A1    Nov. 19, 2015

(30) Foreign Application Priority Data
Nov. 30, 2012  (DE) .................. 10 2012 111 665

(51) Int. Cl.
*G05B 19/418*   (2006.01)
*H04L 12/40*    (2006.01)

(52) U.S. Cl.
CPC .... *G05B 19/4186* (2013.01); *H04L 12/40032* (2013.01); *G05B 2219/31104* (2013.01);
(Continued)

(58) Field of Classification Search
CPC .... H04L 12/40032; G05B 2219/31121; G05B 2219/31135; G05B 2219/31136; G05B 19/4186
See application file for complete search history.

(56) References Cited

U.S. PATENT DOCUMENTS

| 6,122,565 A | 9/2000 | Wenning |
| 8,798,930 B2 | 8/2014 | Wittmer |

(Continued)

FOREIGN PATENT DOCUMENTS

| CN | 101828152 A | 9/2010 |
| DE | 19749002 A1 | 8/1998 |
| DE | 102007026457 A1 | 12/2008 |
| DE | 102009005902 A1 | 6/2010 |
| WO | 2012041616 A1 | 4/2012 |

OTHER PUBLICATIONS

Etschberger, Konrad et al.; Controller Area Network: Basics, Protocols, Chips and Applications; IXXAT Press; Weingarten, Germany; 2001; pp. 189-205.*
English Translation of International Preliminary Report on Patentability, WIPO, Geneva, dated Jun. 11, 2015.
International Search Report EPO,, The Netherlands, dated Feb. 20, 2014.
German Search Report, German PTO, Munich, dated Jul. 29, 2013.
Hart Smart Communications Protocol, UFC500 Ultrasonic Flowmeter Transmitter-Specific Command Specification, Krohne, System Technology, Revision #2, Jul. 9, 2001, 52 pp. in English.

(Continued)

*Primary Examiner* — Glenn A. Auve
(74) *Attorney, Agent, or Firm* — Bacon & Thomas, PLLC

(57) ABSTRACT

A method for operating a fieldbus protocol capable field device, wherein the fieldbus protocol includes at least one command, which serves, depending on a value of an auxiliary variable, for performing a first function, respectively for performing a second function, of field device, wherein the first and second functions differ from one another.

20 Claims, 1 Drawing Sheet

(52) U.S. Cl.
CPC ........... *G05B 2219/31422* (2013.01); *H04L 2012/4026* (2013.01); *Y02P 90/185* (2015.11)

(56) References Cited

U.S. PATENT DOCUMENTS

| | | | |
|---|---|---|---|
| 2005/0270884 A1* | 12/2005 | Richter | G11C 7/1045 365/230.03 |
| 2011/0264240 A1* | 10/2011 | Pettigrew | G05B 19/042 700/7 |
| 2013/0054765 A1* | 2/2013 | Baret | H04L 67/12 709/220 |
| 2013/0187790 A1 | 7/2013 | Konrad et al. | |

OTHER PUBLICATIONS

"Controller-Area-Network" by Konrad Etschberger, Apr. 1, 2002, www.beck.de, 10 pp. in German.

Samson: Technical Information HART Communication, Part 4 Communications, May 22, 2012, http://www.samson.de/pdf_en/1452en.pdf, 40 pp. in English.

* cited by examiner

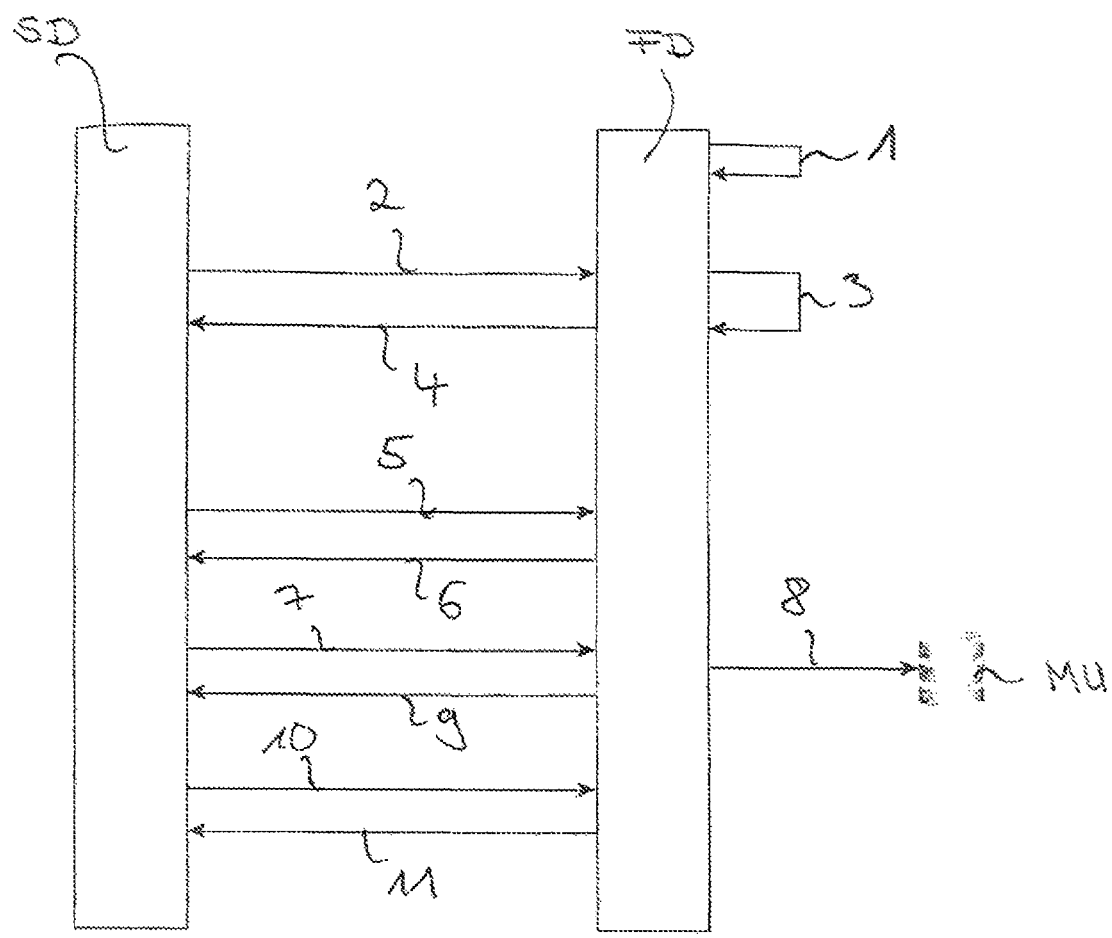

METHOD FOR OPERATING A FIELDBUS PROTOCOL CAPABLE FIELD DEVICE

TECHNICAL FIELD

The invention relates to a method for operating a fieldbus protocol capable field device, a field device for application of the method, a service device for application in the method as well as a computer program product for performing the method.

BACKGROUND DISCUSSION

Currently often applied in plants of process automation technology are field devices, which control processes running in the plant and/or register a measured variable. Such field devices are composed, for example, of a measurement transmitter, to which at least one measuring transducer is connected, which serves for registering a chemical and/or physical, measured variable. Also considered field devices are display- and/or service units, which are used or installed on-site in the plant. These field devices are currently often connected with one another via a fieldbus. In this way, the field devices can exchange with one another and/or with a control unit, which controls the process, information such as, for example, measured values. Known from the state of the art for data transmission via such a fieldbus are various fieldbus protocols.

Furthermore, there are, for example, in the case of the HART protocol different groups of commands. In such case, one distinguishes between universal commands, which are also referred to as basic commands, and general commands, which are also referred to as common practice commands. Furthermore, there are in the case of the HART protocol also device-specific commands.

Also the Profibus protocol is similarly constructed. Its commands can be divided, for example, into basic commands and manufacturer-specific commands. In giving manufacturer-specific commands for the functioning of a field device, it is taught in the state of the art, such as known, for example, from Published international application, WO 2012041616 A1, that a particular command should be unequivocally defined and not, for example, trigger different functions in different field devices connected to the fieldbus.

Field devices are, as a rule, configured via device description based, host systems. These device description based, host systems and service devices, respectively operating programs, give a developer or a service person no control over the point in time and the sequence, in which parameters, respectively parameter sets, are written into the field device. For, depending on system, parameters are written in a fixed sequence into the field device, when via a user interface a change of the parametering is performed. This can lead to problems in practice, since parameters cannot always be changed independently of one another, for often there are dependencies between individual parameters of a field device. Therefore, it is in the case of a parameter change advantageous, when all parameters affected by the dependence are transmitted in a certain sequence to the field device and stored there, in order that no recursive dependency resolutions are required. Above all, in safety-critical applications, a known write sequence of parameters is important.

Another requirement is the writing of an entire parameter set (download) into the field device. In this case, the dependencies between the parameters are resolved by the host system, for example, a control unit, which is connected with the field device via the fieldbus. Thus, the performance of the field device can clearly be increased, when it is known to the field device that a download is taking place, for then it is not necessary that the field device calculate, respectively resolve, dependencies between the parameters during the download.

Furthermore, in the case of a download, the field device does not have to bring about persistence in a non-volatile memory, which can, for example, be integrated in the field device, after the receipt of each parameter, but can, instead, create the persistence after the download is completed, i.e. operate on all downloaded parameters at once.

SUMMARY OF THE INVENTION

It is, thus, an object of the present invention to enable the storing, respectively writing, of parameters into a field device essentially field device independently, i.e. independently of the present version of the field device and independently of the available commands of the fieldbus protocol.

The object is achieved according to the invention by a method for operating a fieldbus protocol capable field device, a field device for use in the method as well as a service device for use in the method and a computer program product.

As regards the method, the object is achieved by a method for operating a fieldbus protocol capable field device, wherein the fieldbus protocol includes at least one command, which serves, depending on a value of an auxiliary variable, for performing a first function, respectively for performing a second function, of the field device, wherein the first and second functions differ from one another. The fieldbus protocol is preferably a protocol for digital data transmission via a fieldbus. As already mentioned, such protocols are already known from the state of the art, such as, for example, the HART protocol and the Profibus protocol or the Foundation Fieldbus protocol. A corresponding fieldbus protocol capable field device includes a corresponding interface, via which data can be exchanged according to the fieldbus protocol applied for communication via the interface. The corresponding mentioned fieldbus protocols make use of, such as above described, commands of different categories, such as, for example, basic commands or manufacturer-specific commands. Preferably, the at least one command, based on the dependence of which a first, respectively second, function of field device is executed, is a basic command of the corresponding fieldbus protocol. This command, respectively the first or second function of field device, is executed as a function of an auxiliary variable. The value of the auxiliary variable can, in such case, be furnished in a memory unit of the field device. After receiving a corresponding command, the value of the auxiliary variable is checked and the first, respectively the second, function of field device executed. Alternatively, the auxiliary variable can also be transmitted in a fieldbus telegram, which also contains the at least one command.

Preferably, the field device transmits back via the fieldbus as response to the command, independently of the function, which is executed, for example, field device internally, as a function of the auxiliary variable, the same response telegram and/or the same report. Independently of whether, thus, the first or the second function is executed, there is transmitted back, for example, to the master, which has issued the command to the field device, one and the same response, for example, in the form a response telegram or a report, for example, in the form a so-called ACKNOWL- EDGE. In the case of the HART protocol, that would be the return code "0", which confirms the successful writing into the field device (independently of which write method was executed or whether anything at all was written (see below)).

In a form of embodiment of the method, the auxiliary variable can assume at least two values. The auxiliary variable can thus also be a Boolean variable, which can assume the values true or false. Furthermore, the auxiliary variable can also be some other kind of variable, such as, for example, a numerical value, preferably an integer, as a function of which a function of field device is executed.

In an additional form of embodiment of the method, the value of the auxiliary variable is determined by a service person. For example, the value of the auxiliary variable can be changed via a servicing element or some other user input. Thus, it is possible, as a function of a user input, to change the value of the auxiliary variable. The value of the auxiliary variable can be set, for example, by software or hardware. For example, a switch, which is located, for example, on the field device, can be used to change the value of the auxiliary variable.

In an additional form of embodiment of the method, the command is a prespecified command or a manufacturer-specific command of the fieldbus protocol, especially a read- or write command. The fieldbus protocol is preferably the HART protocol and the pre-specified command is a universal basic command, respectively a common practice command. According to the fieldbus protocol specification, a parameter may only be referenced by exactly one command. Depending on application, it can be advantageous or required to test the command for plausibility and/or to allow, respectively to prevent, a persisting of the parameter, respectively parameter value, referenced by the command. By application of an auxiliary variable, thus, the command can be assigned another or supplementing meaning.

In an additional form of embodiment of the method, the first function is the function predetermined for, respectively provided by, the command according to the fieldbus protocol. As described in the preceding paragraph, the command is especially preferably a write- or read command, by which the value of a parameter is written or read. The first function of a field device, which is executed as a function by this command, is, thus, the writing or reading of a corresponding parameter referenced by the command.

In an additional form of embodiment of the method, the second function is to refrain from performing the first function. As a function of the auxiliary variable, thus, in spite of obtaining the command, the corresponding function associated with the command can be left undone, i.e. omitted.

In an additional form of embodiment of the method, there occurs as a function of the value of the auxiliary variable the storing of data by means of the field device in a volatile, respectively non-volatile, memory. Preferably, the memory is a memory unit, which is integrated into the field device. This memory unit is, for example, a component of the operating electronics of the field device.

In an additional form of embodiment of the method, a plurality of memory units are provided for storing data by means of the field device, wherein the memory location for storing the data is selected as a function of the value of the auxiliary variable. For example, the different memory units can be volatile, respectively non-volatile, memory units. Furthermore, different memory methods can be used for storing the data, preferably data in the form of parameters.

In an additional form of embodiment of the method, the command is a write command for writing a parameter value of a parameter of the field device into a memory unit of the field device.

In an additional form of embodiment of the method, the command is transmitted to the field device from a service device or a service application. For example, the command can be transmitted via the fieldbus from the service application, respectively the service device, to the field device. It is also an option to transmit the command via a service interface of the field device from the service device, respectively the service application, to the field device. In this case, a corresponding communication protocol can be used for communication between the service device, respectively the service application, and the field device. The protocol can be, for example, a manufacturer-specific protocol, which serves for communication via a service interface of the field device.

In an additional form of embodiment of the method, this variable, respectively a value of the auxiliary variable, is transmitted to the field device in a telegram together with the command. Thus, for example, another function of field device can be executed upon each new transmission of the command to the field device. Furthermore, it can also be provided that the function of field device resolved from the command does not change until a new value of the auxiliary variable is established.

In an additional form of embodiment of the method, the auxiliary variable is assigned a first value and a first command transmitted to the field device and a first function corresponding to this command executed by the field device, wherein the auxiliary variable is then assigned a second value, which differs from the first value and then a second command is transmitted to the field device and a second function executed by the field device, wherein the second function differs from the first function and the first and second commands are identical. Thus, the same command can be used for performing different functions of the field device as a function of a value of the auxiliary variable.

In an additional form of embodiment of the method, after the second function is executed at least once, the auxiliary variable is set back to the first value. Thus, the first function of field device can serve as a default function, which is executed when no other value of the auxiliary variable is set.

As regards the field device, the object is achieved by a field device for use in the method according to one of the preceding forms of embodiment.

Furthermore, the object is achieved as regards the service device by a service device for use in the method according to one of the preceding forms of embodiment.

As regards the computer program product, the object is achieved by a computer program product with program code means, which is executed for performing the method according to one of the preceding forms of embodiment. The method can be implemented, for example, in the software of the service device or the software of the field device. The software can be formed, for example, by means of program code means, such as a programming language, for example, C, C++, Java, etc.

BRIEF DESCRIPTION OF THE DRAWINGS

The invention will now be explained in greater detail based on the appended drawing, the sole FIGURE of which shows as follows:

FIG. 1 is a schematic representation of a form of embodiment of the proposed method.

DETAILED DISCUSSION IN CONJUNCTION WITH THE DRAWINGS

FIG. 1 shows the time course of steps of a data exchange between a service device SD, on which runs, for example, a service application, and a field device FD. In a first method step 1, the base state of the auxiliary variable, i.e. a value of the auxiliary variable, is set, according to which a function of field device FD, in this case, the storing of an obtained parameter value, is deactivated. In a second method step 2, a parameter value and its address are transmitted from the service device SD to the field device FD, wherein, however, due to the value of the auxiliary variable in a third method step 3, this value is dropped, i.e. not stored in the field device FD. Nevertheless, in a fourth method step 4, the field device FD sends back to the service device SD a positive response indicating successful receipt of the parameter value. In a fifth method step 5, the writing and storing of a parameter value transmitted from the service device SD to the field device FD is activated. And, in a sixth method step 6, a response confirming receipt of this command is transmitted from the field device FD back to the service device SD. If now in a seventh method step 7, a parameter value and an address are transmitted from the service device SD to the field device FD, then, in an eighth method step 8, the parameter value is stored in a memory unit MU of the field device FD. Also, in this case, in a ninth method step 9, a positive report is sent back from the field device FD to the service device SD. In a tenth method step 10, then the write command can again be deactivated, so that, in the case of receipt of a parameter value, the value of the parameter is not stored in the field device FD, but, instead, the value is dropped. Thereupon, in turn, in an eleventh method step 11, a positive response concerning receipt of the command, by which the write command is deactivated, can be sent from the field device FD to the service device SD. The command, by which the write command is activated, respectively deactivated, can be an auxiliary variable, based on which a command, such as, for example, receipt of a parameter value and an address, is processed by the field device FD. Instead of the write command, it can also be another command, such as, for example, a read command. The configuration of this write- or read command is, in such case, communicated by the field device FD via additional parameters before the performing of the writing- or read command. By setting the auxiliary variable, then a download, for example, of all parameters or individual parameters or a group of parameters can occur. Thus, for example, the write command can be switched to inactive, such as in the example of an embodiment according to FIG. 1, and in this state no new parameter values can be written by the field device FD. In order, however, to prevent error reports from the host system, such as, for example, the service device SD, the field device FD answers such a write command with a positive response. The fifth method step 5, by which the write command is again deactivated can occur, for example, by a user interaction such as, for example, a button press or be made to happen upon the ending of a dialogue. The parameter values can then be transmitted to the field device FD in, for example, a predetermined sequence.

Alternatively, the auxiliary variable can be set in such a manner that thereby the parameter values received from the field device FD are not retained, i.e. are not persistent. In order, for example, to configure a field device FD on a trial basis, the persistence of the parameters can be turned off. This means that a change of the parameters and the parameter values occurs only in a volatile memory. Following the reboot of the field device FD, then the original parameter set, which is stored in a non-volatile memory MU, reappears.

Furthermore, by replacing the auxiliary variable, the persistence location, where the parameter, respectively parameter values, are stored, can be determined. Thus, for example, an EEPROM and a USB-port can be installed in a field device. By setting the auxiliary variable, it can then be specified whether the parameter should be stored in the EEPROM or in the USB storage medium.

Furthermore, by setting the auxiliary variable, the resolving of the dependencies among the parameters can be turned off. For the case in which a plurality of parameters are sent to the field device FD, without their dependencies being resolved, such as, for example, in the case of a download of an entire parameter set, as explained above, the dependencies of the parameters can be resolved by the host system such as, for example, by the service device SD or a service application.

The auxiliary variable can be, for example, a flag, which is stored in the program code of the field device. This flag can serve, for example, in the case of receipt of a write command to resolve, respectively to initiate or to perform, a corresponding function of the field device (FD).

The invention claimed is:

1. A method for operating a fieldbus-protocol-capable field device, comprising:
   providing at least one command, which serves, for performing a first function or a second function, of the field device and, as a function of a value of an auxiliary variable, either said first function or said second function is performed, wherein:
   the first and second functions differ from one another.

2. The method as claimed in claim 1, wherein:
   the protocol-capable field device transmits back via the fieldbus as a response to the at least one command, the same response telegram and/or the same report,
   independently of the respective first or second function which is executed as a function of the value of the auxiliary variable internally in the field device.

3. The method as claimed in claim 1, wherein:
   the auxiliary variable can assume at least two values.

4. The method as claimed in claim 1, wherein:
   the value of the auxiliary variable is determined by a service person.

5. The method as claimed in claim 1, wherein:
   said command is a prespecified command or a manufacturer-specific command of the fieldbus protocol of said fieldbus protocol capable field device; and
   said command is a read and write command.

6. The method as claimed in claim 1, wherein:
   the first function is a function, which is predetermined for the command by the fieldbus protocol.

7. The method as claimed in claim 1, wherein:
   the second function is to refrain from performing the first function.

8. The method as claimed in claim 1, wherein:
   data is stored, as a function of the value of the auxiliary variable by means of the field device in a volatile memory unit of the field device.

9. The method as claimed in claim 1, wherein:
   a plurality of memory units are provided for storing data by means of the field device; and amongst said plurality of memory units, a memory location for storing the data is selected as a function of the value of the auxiliary variable.

10. The method as claimed in claim 1, wherein:
the command is a write command for writing a parameter value of a parameter of the field device into a memory unit of the field device.

11. The method as claimed in claim 1, wherein:
the command is transmitted to the field device from a service device or a service application.

12. The method as claimed in claim 1, wherein:
the value of the auxiliary variable, is transmitted to the field device in a telegram together with the command.

13. The method as claimed in claim 1, wherein:
the auxiliary variable is assigned a first value, and a first command is transmitted to the field device, and a first function corresponding to said first command is executed by the field device;
the auxiliary variable is then assigned a second value, which differs from the first value, and then a second command is transmitted to the field device;
a second function is executed by the field device;
the second function differs from the first function; and
the first and second commands are identical.

14. The method as claimed in claim 13, wherein:
after the second function is executed at least once, the auxiliary variable is set back to the first value.

15. The method as claimed in claim 1, wherein:
said command is a prespecified command or a manufacturer-specific command of the fieldbus protocol of said fieldbus protocol capable field device; and
said command is a write command.

16. The method as claimed in claim 1, wherein:
data is stored as a function of the value of the auxiliary variable by means of the field device in a non-volatile memory unit of the field device.

17. A fieldbus-protocol-capable field device method, comprising:
providing at least one command, which serves, for performing a first function or a second function of said field device and, as a function of a value of an auxiliary variable, either said first function or said second function is performed, wherein the first and second functions differ from one another.

18. The fieldbus-protocol-capable field device method as claimed in claim 17, wherein:
a computer program product with program code means is implemented in the field device; and
said computer program product serves, when executed, for performing the method.

19. A service device method, comprising:
providing at least one command, which serves, for performing a first function or a second function of said field device and, as a function of a value of an auxiliary variable, either said first function or said second function is performed, wherein;
the first and second functions differ from one another.

20. The service device method as claimed in claim 19, wherein:
a computer program product with program code means is implemented in the service device; and
said computer program product serves, when executed, for performing the method.

* * * * *